Feb. 24, 1931. H. M. GEHL 1,793,476
ENSILAGE CUTTER
Filed Jan. 3, 1927 3 Sheets-Sheet 1
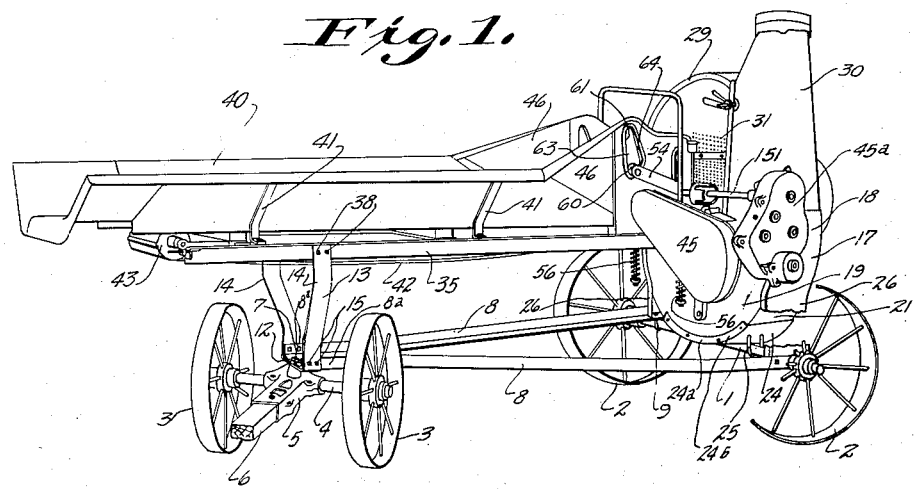
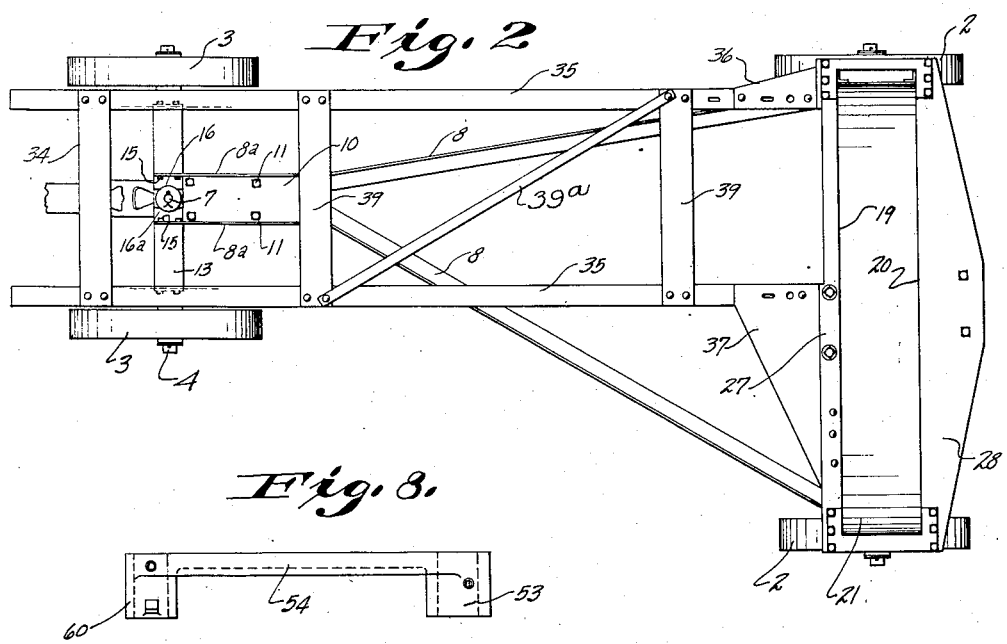
INVENTOR.
Henry M. Gehl
BY
ATTORNEY.

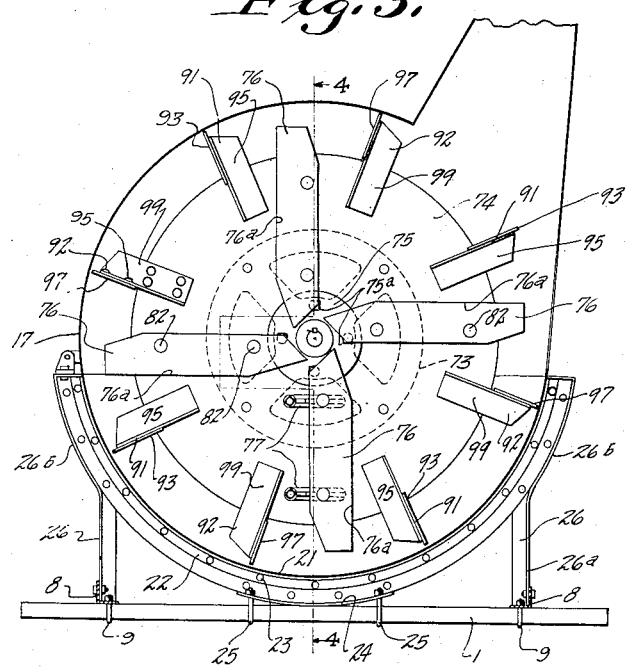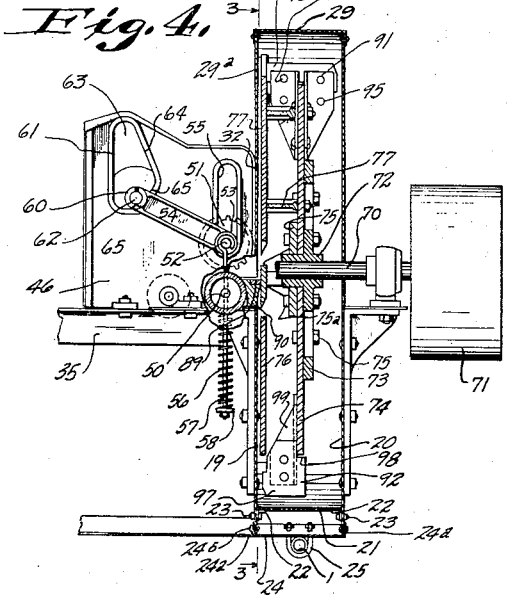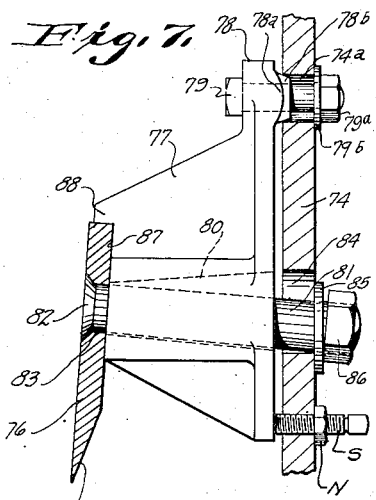

Feb. 24, 1931.　　　　H. M. GEHL　　　　1,793,476
ENSILAGE CUTTER
Filed Jan. 3, 1927　　　3 Sheets-Sheet 3
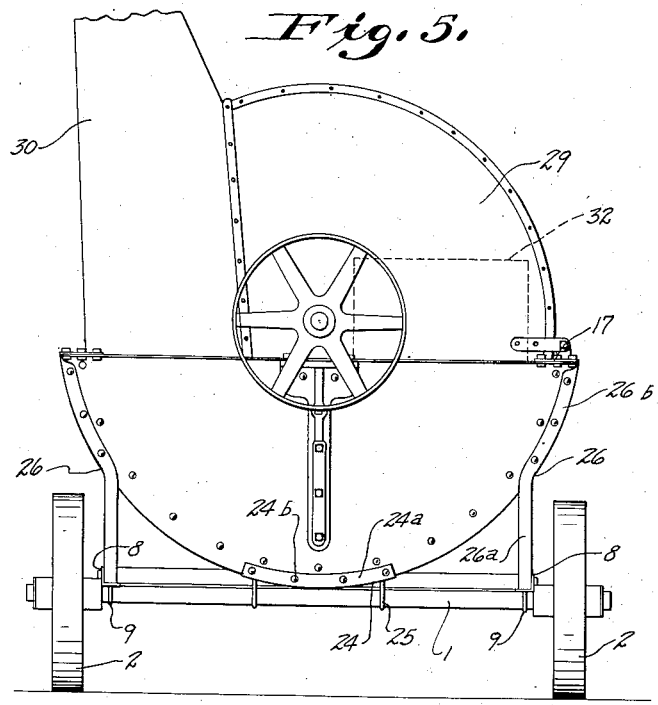
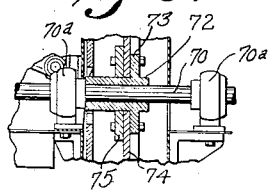
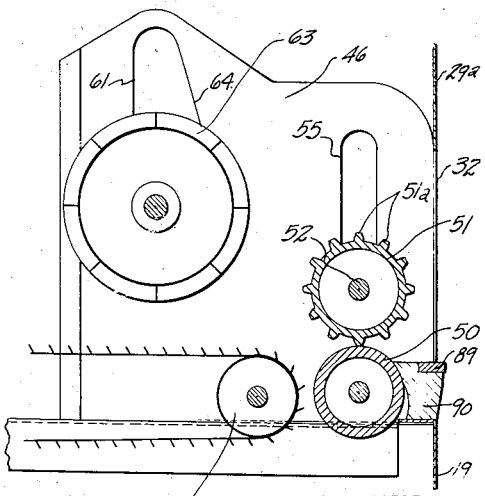
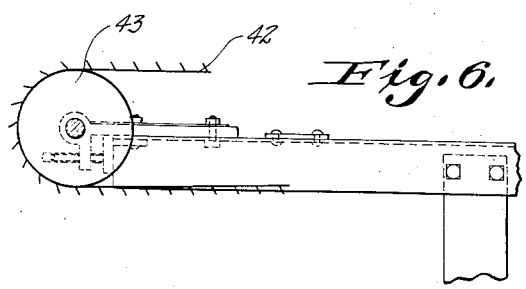
INVENTOR.
Henry M. Gehl Patented Feb. 24, 1931

1,793,476

UNITED STATES PATENT OFFICE

HENRY M. GEHL, OF WEST BEND, WISCONSIN

ENSILAGE CUTTER

Application filed January 3, 1927. Serial No. 158,447.

This invention relates to an improved ensilage cutter of the blower type wherein the ensilage is cut and elevated into a silo in one operation. In ensilage cutters of this type the fodder is delivered on to an endless feed conveyor and carried by the conveyor to feed rolls which are positively driven and which carry the ensilage into a blower casing. As the ensilage enters the blower casing it is cut up by means of rotary knives which are rotated past a ledger plate located at the entrance to the blower casing. The rotary knives are carried on a disc which operates in the blower housing and which also carries fan blades serving to set up a current of air leading to the silo. The blades of the fan strike and drive or throw the cut ensilage up into the silo and this positive mechanical action of the fan blades in throwing the ensilage up into the silo is a larger factor in the elevation of the ensilage than the current of air set up by the fan blades. The action of the fan blades in mechanically propelling the ensilage makes it desirable to employ a considerable number of fan blades but the employment of any great number of fan blades, in the manner heretofore known in the art, has had such serious disadvantages as to more than overcome the advantages realized. The chief disadvantage of the employment of a number of fan blades, as heretofore proposed in the art, resides in the fact that the more fan blades used the greater the air displaced and the more air displaced the greater the power consumption. A material increase in the power consumption is highly undesirable in this type of machine which must be light running so that it can be run with the power available on the farm or at such place as the ensilage cutter is used.

Another disadvantage of employing many fan blades resides in the fact that the heavy air currents induced set up an undesirable blowing action in the silo.

One of the principal objects of the present invention is to provide an ensilage cutter of this character employing a relatively large number of fan blades which operate to mechanically and positively exert a direct propelling action on the ensilage without displacing any great quantity of air, whereby to minimize the power consumption and to avoid the setting up of undesirable heavy air currents. Thus, a light running ensilage cutter is provided which may be conveniently operated with the power available on the farm or the like and which has a greater capacity for handling a large volume of ensilage in a relatively short space of time than any machine heretofore known or used.

Another object of the invention resides in the provision of a novel feeding mechanism for feeding the corn or fodder to the cutting mechanism, the feeding mechanism operating to exert a variable pressure on the corn or the fodder in such a manner as to maintain a steady uniform feed even though the amount of corn or fodder supplied to the mechanism varies. With the present invention, even though several bundles of fodder or corn over-lap, they will nevertheless be fed into the machine because under such conditions the pressure which the feeding mechanism exerts is automatically increased and this applies to all of the feeding rolls, whereby to maintain a continuous uniform feed.

Another important object of the invention resides in the provision of a generally simplified ensilage cutter, which is strong, rigid and durable in construction yet comparatively light in weight, the organization being such as to dispense with a frame or mounting for the blower housing and associated parts, while increasing rather than lessening the features of strength, rigidity and durability mentioned.

Other objects and advantages reside in certain novel features of the construction, arrangement and combination of parts, which will be hereinafter more fully described and particularly pointed out in the appended claims, reference being had to the accompanying drawing forming a part of this specification and in which:

Figure 1 is a perspective view showing an ensilage cutter embodying the present invention.

Figure 2 is a plan view of the cutter with the feeding mechanism, the upper part of the blower housing, the fan, knives and associated structure removed to illustrate the frame construction.

Figure 3 is a view in transverse vertical section taken on line 3—3 of Figure 4.

Figure 4 is a view of the blower housing in longitudinal vertical section taken on line 4—4 of Figure 3, the adjacent feeding mechanism being shown in side elevation.

Figure 5 is a view of the machine in rear elevation.

Figure 6 is a fragmentary view partly in side elevation and partly in central vertical longitudinal section showing the feeding means;

Figure 7 is a fragmentary detail view partly in section and partly in elevation and illustrating the means employed by securing the knives in position;

Figure 8 is a detail view of one of the links employed for mounting the beater roll; and Figure 9 is a fragmentary sectional view showing the mounting of the shaft of the blower.

Referring to the drawing, it will be seen that the ensilage cutter is provided with running gear, including a rear axle 1 on which rear wheels 2 are rotatably mounted. A pair of front wheels 3 are also provided and are rotatably mounted on a front axle 4 having a casting 5 secured to its center and provided with a socket for a pole or tongue 6 and a mounting for a king bolt 7. The front and rear axles are interconnected by means of a pair of angle bars 8, the rear ends of which are fastened to the rear axle 1 by means of U bolts and nuts 9. The bars 8, although being inclined to different degrees, converge toward the front of the machine, as shown in Figure 2, and their forward end portions are bent or angled in respect to the main portions of the bars, so that these forward end portions which are designated at 8ª extend in substantial parallelism to each other. A plate 10 is received between the portions 8ª of the bars 8 and is securely fastened in position by suitable fastening means, such as bolts and nuts 11. The plate 10 terminates short of the forward extremities of the portions 8ª of the bars 8, as clearly shown in Figure 2, and between these unobstructed forward extremities the king bolt 7 extends, this king bolt 7 passing through the body portion 12 of a yoke designated generally at 13. The yoke 13 has its body portion underlying the forward extremities of the portions 8ª of the bars 8, and its legs 14 extending up along the outside of the bars 8 and generally diverging from each other. The lower portions of the legs 14 are fastened to the angle bars 8 by means of bolts and nuts 15. Thus the king bolt 7 is connected with the bars 8 through the body portion 12 of the yoke 13. Preferably a washer 16 is fitted on the upper end of the king bolt 7 and engages the horizontal flanges of the forward extremities of the portions 8ª of the bars 8, the washer being held against displacement by a pin 16ª.

At the rear of the machine a blower housing designated generally at 17 is provided. This blower housing has a lower section 18 made of relatively heavy metal, the lower section 18 being of semi-cylindrical form and including spaced vertical side walls 19 and 20 and a semi-circular peripheral wall 21 extending between and connected to the walls 19 and 20 adjacent to and around their outer peripheral edges. The connection between the walls 19 and 20 is preferably accomplished through semi-circular connecting irons or strips 22 of angle cross section, the strips having flanges welded or otherwise suitably secured to the wall 21 and also having flanges fastened by means of bolts and nuts 23 to the walls 19 and 20. As illustrated to advantage in Figures 3 and 4, the wall 21 is set inwardly slightly from the outer peripheral edges of the plates 19 and 20. The lower section 18 of the blower housing has a central supporting or mounting plate 24 which extends between lower portions of the peripheral edges of the walls 19 and 20, this plate 24 being located centrally of the blower housing 17 and at the bottom thereof. As shown, the mounting plate 24 has attaching flanges 24ª which over-lap the edges of the plates 19 and 20 and are riveted thereto as indicated at 24ᵇ. This mounting plate 24 rests directly on the rear axle 1, and it is bolted in position on the axle by means of U bolts and nuts 25, the bolts encircling the axle and extending through the plate 24 near each end thereof. The mounting of the lower section of the blower housing on the rear axle is completed by means of a pair of side standards 26 of channel cross section, the standards 26 having straight, vertical portions 26ª with their lower ends resting on and bolted to the portions of the angle bars 8 that are supported on the axle 1. These standards 26 also have curved or arcuate portions 26ᵇ which snugly embrace and are riveted to the upper peripheral portions of the walls 19 and 20. The upper ends of the walls 19 and 20 are flanged as indicated at 27 and 28 and on these flanged portions an upper section 29 rests and is suitably hinged and releasably secured in the manner conventional in the art. The upper section 29 has the general form of half a cylinder but is provided with a tangential outlet 30. It is similar in construction to the lower section in other respects except that it is flanged to facilitate its mounting and attachment to the lower section. The front wall 29ª of the upper section is formed with the usual air inlet openings 31, and with an inlet opening 32 (see Fig. 6) in through which the corn or fodder is fed.

A frame is provided for supporting the feeding means and this frame consists of a pair of side bars 35 extending longitudinally of the machine as shown in Figures 1 and 2, the rear ends of the bars being rigidly connected to the lower section of the blower housing by means of attaching plates 36 and 37, riveted or otherwise suitably secured to the bars 35 and bolted or otherwise suitably secured to the flange 27 of the lower section of the blower housing. The bars 35 extend in substantial parallelism with respect to each other and their forward portions are riveted or otherwise suitably secured as indicated at 38 to the upper ends of the legs 14 of the yoke 13. Cross members 39 extend between the bars 35 and are secured at their ends to the bars and an inclined bracing or truss member 39ª extends at an angle between the bars and is secured to the bars 35 at the connection of certain of the cross members 39 therewith, as shown in Figure 2. By providing a stiff and rigid frame of this character, not only is a support for the feeding mechanism provided, but the blower housing is stiffened and strengthened, especially as a rigid bridge is provided around the inlet opening 32. This is one of the features that makes it possible to eliminate a frame for the blower housing and to directly mount this housing on the rear axle.

A feed table or feed trough 40 is provided and is supported on the bars 35 by means of supporting standards 41. Along the bottom of this feed table or trough the upper run of an endless force feed conveyor 42 travels. The conveyor 42 is carried on mounting and driving members 43 and 44, the member 44 being driven at a controlled and variable rate of speed through a selective variable speed gear set 45 of the type usually employed in the art. As indicated in Figures 1 and 6 the upper run of the conveyor 42 travels along the bottom of the feed table 40, but the lower run thereof travels beneath the bottom of this feed table, the upper run passing through slots or openings in the bottom of the feed table.

At the end of the feed table, adjacent the blower housing, the feed table is provided with enlarged side members 46 on which a novel feed roll arrangement is mounted. The feed roll arrangement comprises a pair of pressure rolls 50 and 51, the roll 50 having a smooth periphery and being mounted on a shaft to rotate about a fixed axis, the shaft being driven at a variable and controlled rate of speed through the gear set 45ª. Roll 51 is located just above the roll 50 and has longitudinal ridges 51ª at spaced angular intervals of the periphery. The roll 51 is mounted on a shaft 52 which has its end portions projecting through flanged hubs or bearings 53 provided on the lower ends of links 54, the flanged hubs or bearings 53 being slidably fitted in vertical slots 55 provided in the side members 46. The roll 51 is yieldably urged toward the roll 50 by means of coil spring 56 encircling tensioning rods 57, the rods 57 slidably extending through openings provided therefore in the bars 35 and having hooks at their upper ends embracing the shaft 52. As illustrated in dotted lines in Figure 4 the springs 56 have their upper ends abutting the frame members 35 and have their lower ends engaging abutments 58, fixed to the rods 57. With this arrangement the corn or fodder passing between the rolls 51 and 52 is always subjected to pressure and the farther the rolls are forced apart the more the springs are tensioned and the greater the pressure. At their ends, opposite the flanged hubs 53, the links 54 are provided with flanged hubs or bearings 60 which operate in slots 61 provided in the side members 45 and which receive the shaft 62 of a beater roll 63. The roll 63 is relatively large and is ribbed like the roll 51. Normally this roll 63 does not exert pressure on the corn or fodder passing beneath the same, but when the amount of corn or fodder is considerably increased, as for instance, when several over-lapping bundles pass under the beater roll 63, this beater roll is elevated and the elevation of the beater roll swings the links 54 until their flanged bearings 60 engage the inclined walls 64 of the slots 61. This results in the beater roll 63 exerting considerable pressure on the corn or fodder and the more that the roll 63 is elevated the greater the pressure. At this point it is to be noted the slots 61 have walls 65 inclining oppositely with respect to the walls 64 so that when the beater roll is first elevated there will be no pressure exerted but when the elevation exceeds a predetermined amount considerable pressure is exerted. When the beater roll 63 is elevated by a very large bundle or by overlapping bundles, it not only swings the links 54 but also pulls the same upwardly thereby raising roll 51 and permitting the rolls 50 and 51 to take the large or overlapping bundles.

Rolls 51 and 63 are positively driven in the usual manner, the roll 51 being driven through a flexible line including the shaft 151 and roll 63 being driven by chain and sprocket gearing from the shaft 52. The flexible drive line permits the roll 51 to move up and down and yet be positively driven and as the roll 63 moves about the axis of the roll 51 as the center it may be conveniently driven from this roll 51.

The cutting and blowing mechanism located within the blower housing 17 will now be described.

A shaft 70 is rotatably mounted in suitable bearings 70ª mounted on brackets provided therefor on the lower half of the blower housing (see Figures 4 and 9), the shaft 70 having a pulley 71 fixed thereto, whereby it may be driven from any suitable source of power. Within the blower housing, a sleeve 72 is keyed on the shaft 70 and has a flange 73 integral therewith. To this flange 73 a disc or rotor 74 is secured by means of a clamping plate 75 and bolts and nuts 75a. A plurality of knives or cutters 76 are mounted on the disc 74 and preferably at least four cutters or knives 76 are provided. The knives are formed with radial cutting edges 76a and are adjustably mounted on the disc 74 and in spaced relation thereto, by means of mounting lugs 77. A pair of mounting lugs 77 is provided for each knife as shown in Figures 3 and 4.

As shown in Figure 7 each lug 77 has an apertured attaching ear 78 and integral with the ear 78 and around its aperture a rounded bearing boss 78a is formed, the boss 78a having a tapered projection 78b. A bolt 79 extends through the ear 78, its boss 78a and projection 78b and passes through a slot 74a formed in the disc 74. A nut 79a is threaded on the bolt and bears against a washer 79b interposed between the nut and disc 74 and in this way coacts with the bolt 79 to cause the boss 78a to have binding engagement with the wall of the slot 74a in any adjusted position of the lug 77. The body of each lug 77 is formed with an opening 80 which flares toward the inner face of the lug. A bolt 81 is provided and has a bevelled head 82 fitted in a countersunk opening 83 in its knife 76, the shank of the bolt 81 passing through the opening 80 and through an opening 84 formed in the disc 74. The opening 84 is larger than the bolt 81 so as to receive bolt 81 even when the same is inclined, as shown in Figure 7. A washer 85 fitted on the bolt 81 spans the opening 84 and is clamped against the disc 74 by a nut 86. A set screw S is threaded through the disc 74 and bears against the end of the lug 77, opposite its ear 78, this set screw S being held in adjusted position by the lock nut N. With the desired adjustment obtained by turning the set screw as may be desired and then locking it in adjusting position, the lug 77 is held firmly up against the set screw by means of the bolt 81, washer 85 and nut 86, which not only serves to hold the knife against the lug 77 but which also coacts with the set screw and the bolt 79 and boss 78a to hold the knife and lug assembly in proper position and adjustment. By providing the projection 78b and boss 78a the bolt 79 is relieved of shearing strains as the thrust is taken by the projection 78b and boss 78a.

Each lug 77 has an inclined seat 87 on which its knife 76 is held and the rear edge of each knife abuts a shoulder 88 formed on the lugs on which it is mounted. In this way the knives are firmly and securely held in any adjustment. The knives 76 successively sweep past a ledger plate 89 mounted on a carrier extending across the lower edge of the bottom of the inlet or intake opening 32 of the blower housing. The coaction of the knives and ledger plate results in the cutting up of the corn or fodder in the usual manner although the capacity for the adjustment of the knives and the employment of at least four knives enhances this cutting action.

In advance of each knife 76 a full fan 91 is mounted on the disc 74 and rearwardly of each knife 76 a fractional fan 92 is mounted on the disc 74. As clearly shown in Figure 4, each full fan 91 extends on both sides of the disc 74 and occupies substantially the entire transverse extent or width of the blower housing. Each fractional fan 92 occupies only half of the transverse extent or width of the housing and lies on the same side of the disc 74 as the knives 76 and the ledger plate 89. Each full fan 91 is made up of a body plate 93 of such size as to straddle the disc 74. A pair of attaching plates 95 is provided for securing each body plate 93 to the disc 74, the attaching plates being in the form of angles having flanges riveted to the disc 74 and flanges riveted to the plate 93 and being tapered as shown. Although the shape of the body plates 93 may be varied, preferably each plate 93 is so shaped as to extend down on one face of the disc 74 and then project straight across the edge of the disc, that is the body plates 93 are approximately or generally L-shaped. Each fractional fan 92 comprises a body plate 97, notched as at 98 to overlap the edge of the disc 74 and having a single attaching angle 99 provided with a flange riveted thereto and a flange riveted to the disc 74.

With this construction the corn or fodder fed into the blower housing is first subjected to a cutting action brought about by the sweeping of the knives 76 past the ledger plate 89. The cut corn or fodder that is the ensilage is next subjected to the action of the fractional fan which follows the cutter. This fractional fan strikes the ensilage and, by the force with which it strikes it and follows it through the blower housing, propels the ensilage around through the blower housing and eventually out through the discharge 30 thereof and up into the silo. Practically all of the ensilage remains on the same side of the disc 74 as the knives 76 and fractional fans 92 in the major portion of its travel through the blower housing. Thus it is possible to effectively employ fractional fans which mechanically impel or drive the ensilage without setting up unnecessary and undesirable currents of air and consequently without using up power or unnecessarily displacing air. As soon as any ensilage escapes past the disc 74 to the side thereof opposite the fractional fans and knives it is acted upon by the full fans 91 located in advance of the knives. Full fans 91, together with the fractional fans 92, set up the desirable current of air required to aid the mechanical impetus imparted to the ensilage for the purpose of conveying the same into the silo.

The employment of a plurality of knives and fans enhances the capacity of the cutter without manually raising its power requirements so that a light running machine is still had, the novel feeding mechanism, by producing a forced feed even when there is a congestion of bundles, also enhances the capacity of the machine and provides a smooth, even and continuous operation. These advantages are had in extremely simple and light weight construction which is withal strong, rigid and durable. No special frame is required for the blower housing but the blower housing itself forms a part of the frame and together with the special frame employed for the feeding means provides an extremely simple yet stiff, strong and rigid structure.

The claims of the invention are:

1. An ensilage cutter of the character described comprising a blower housing having an inlet opening and also having discharge means, a ledger plate mounted on the housing adjacent the inlet opening, a fan rotatably mounted within the housing and having knives cooperable with the ledger plate, said fan having fan blades mounted thereon, there being a full fan blade in advance of each cutter and a fractional fan blade rearwardly of each cutter.

2. An ensilage cutter of the character described comprising a blower housing and a shaft extending into the housing, a rotor mounted on the shaft midway between the side walls of the housing, a series of full fan blades mounted on the rotor and extending on the opposite sides thereof, and a series of fractional fans positioned intermediate the full fans and extending on one side only of the rotor.

3. An ensilage cutter of the character described comprising a blower housing of generally cylindrical form and made up of side walls and a generally cylindrical wall extending between the side walls, a shaft extending into the housing at the center thereof, a rotor disc fixed to the shaft midway between the walls of the housing, one of the walls of the housing having an inlet opening, a ledger plate adjacent the inlet opening, a plurality of knives mounted on the disc and cooperable with the ledger plate, a full fan blade mounted on the disc in advance of each knife, each full fan blade extending on both sides of the disc and a fractional fan blade mounted on the disc behind each knife, each fractional fan blade extending on that side only of the disc on which the inlet opening is provided.

4. An ensilage cutter comprising a blower housing, and a plurality of fans operating in the blower housing and comprising full fans of such size as to occupy substantially the entire transverse extent of the interior of the blower housing and fractional fans of substantially less size transversely than the blower housing and than the full fans whereby to keep the amount of air displaced within proper and normal limits while materially increasing the mechanical propelling action of the fans.

5. An ensilage cutter having a housing provided with a ledger plate, a rotor mounted within the housing, knives cooperable to the ledger plate and means for mounting the knives on the rotor for adjustment toward and away from the ledger plate, and comprising mounting lugs associated with the rotor and with the knives, means for rockably supporting each lug upon the rotor and including a rounded boss formed on the lug and having a projection, the rotor having a slot into which the projection extends, means coacting with the slot to fasten the boss and projection in adjusted position, means coacting with the lug for swinging the lug on the rockable mounting afforded by its boss and projection and means for securing each lug in adjusted position.

6. An ensilage cutter of the character described having feeding mechanism including a pair of pressure rolls, means for mounting one of the pressure rolls upward and away from the other pressure roll, spring means tending to move said movable pressure roll toward the other pressure roll, a beater roll carried by the mounting for the movable pressure roll and means cooperable with the beater roll for causing the same to exercise a positive downward pressure and to lift the movable pressure roll after elevation to a predetermined extent.

7. An ensilage cutter of the character described having feeding mechanism including a pair of pressure rolls, means for mounting one of the pressure rolls for movement upward and away from the other pressure roll, spring means tending to move said movable pressure roll toward the other pressure roll, a beater roll carried by the mounting for the movable pressure roll and means cooperable with the beater roll for causing the same to exercise a positive downward pressure and to lift the movable pressure roll upon elevation to a predetermined extent, said means including side members having slots with reversely inclined walls successively engaging the mounting of the beater roll.

8. An ensilage cutter of the character described comprising a feeding table having enlarged side members at its discharge end, a fixed pressure roll rotatably mounted on said side members, said side members having straight vertical slots above said fixed roll, a movable pressure roll coacting with the fixed pressure roll, mounting links having flanged bearing portions receiving the shaft of the movable pressure roll and slidably fitted in the vertical slots of the side members, spring means coacting with the flanged bearing portions of the links and tending to urge the movable pressure roll downwardly, a beater roll mounted on the opposite ends of said links, said side member having openings formed with inclined walls, the openings receiving the flanged bearing portions at the upper ends of the links, certain of said inclined walls engaging the upper bearing portions of the links to cause the beater roll to exercise a positive pressure when elevated to a predetermined extent.

9. An ensilage cutter of the character described comprising a feeding table having side members at its discharge end, a fixed pressure roll, a movable pressure roll coacting with the fixed pressure roll, said side members having guide slots for the movable pressure roll and also having openings formed with inclined walls, a beater roll, mounting means interconnecting the beater roll and the movable pressure roll and coacting with the slots and openings of the side members to cause the beater roll to exert a lifting action on the movable pressure roll and a positive downward pressure on the material on the feeding table after freely moving upwardly through a predetermined extent.

10. A mounting for adjustably positioning and securing the knife of an ensilage cutter on the rotor thereof and including a mounting lug having a portion rockably mounted on the rotor, the rotor having an opening adjacent said rockable mounting, a projection on the lug engaged within the opening of the rotor and means for securing the lug in adjusted position.

11. An ensilage cutter of the character described having feeding mechanism including cooperating feed rolls, one of said feed rolls being movable, means for urging the feed rolls toward each other, a beater roll supported for rotary and bodily upward movement, means cooperable with the beater roll to cause it to exert a positive downward pressure after it has moved upwardly a predetermined extent, and a connection between the beater roll and the movable feed roll for causing the movable feed roll to move away from the other feed roll when the beater roll is elevated.

In witness whereof, I hereto affix my signature.

HENRY M. GEHL.